July 6, 1954  M. P. SCHIRA, JR  2,682,837
VARIABLE DISPLACEMENT HYDRAULIC TORQUE CONVERTER
Filed Nov. 16, 1951  3 Sheets-Sheet 1
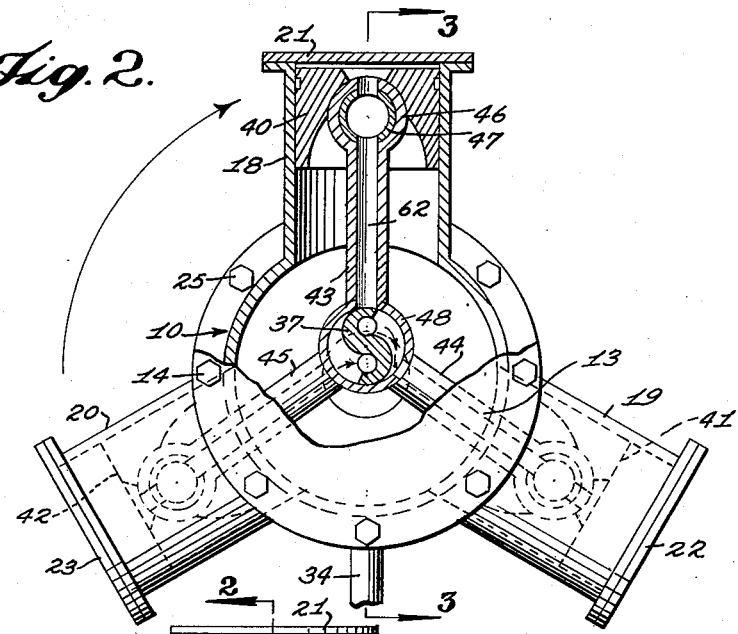
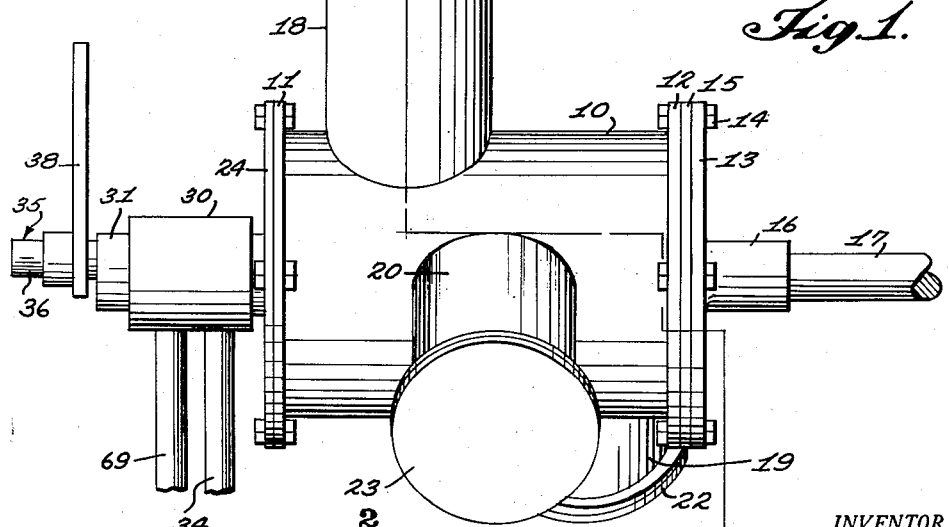
INVENTOR.
MARTIN P. SCHIRA, JR
BY
McMorrow, Berman + Davidson
ATTORNEYS July 6, 1954        M. P. SCHIRA, JR        2,682,837
VARIABLE DISPLACEMENT HYDRAULIC TORQUE CONVERTER
Filed Nov. 16, 1951                                  3 Sheets-Sheet 2
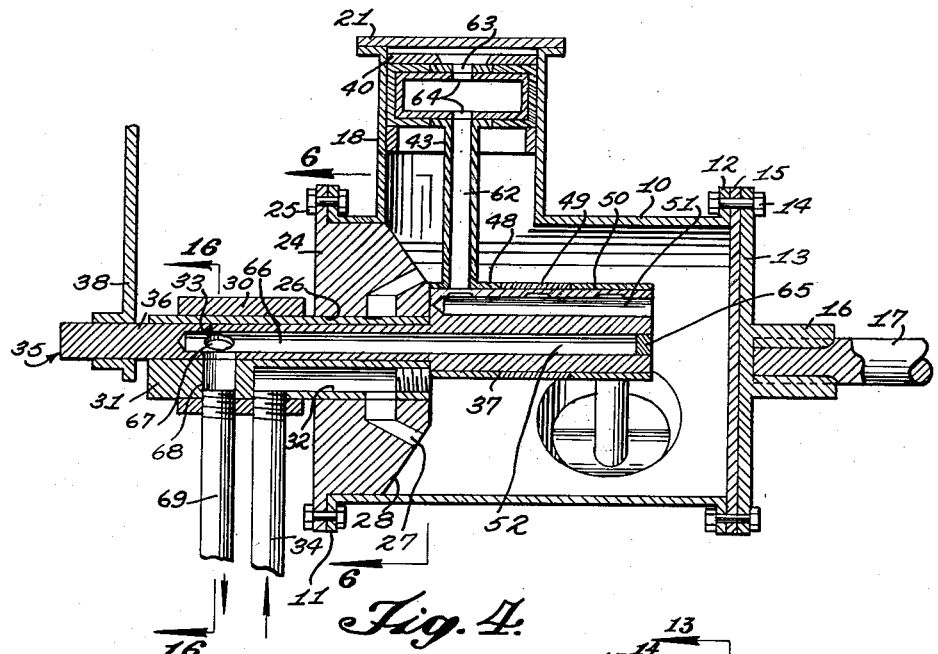
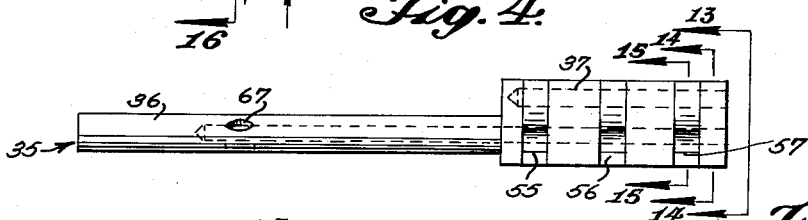
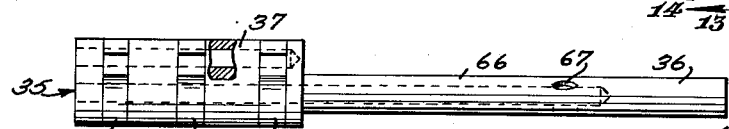
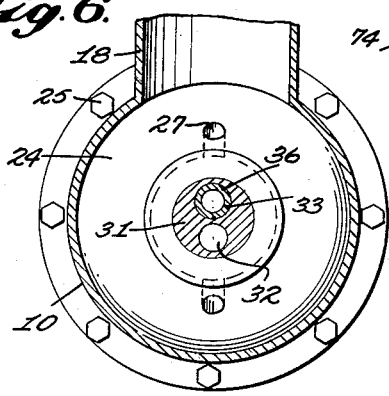
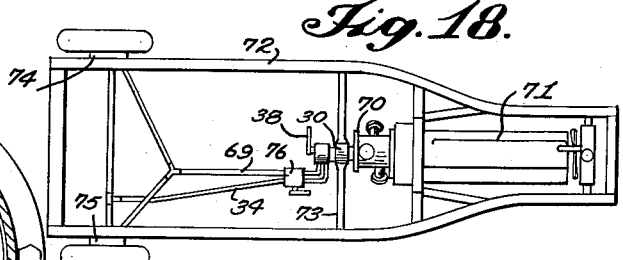
INVENTOR.
MARTIN P. SCHIRA, JR
BY
McMorrow, Berman + Davidson
ATTORNEYS

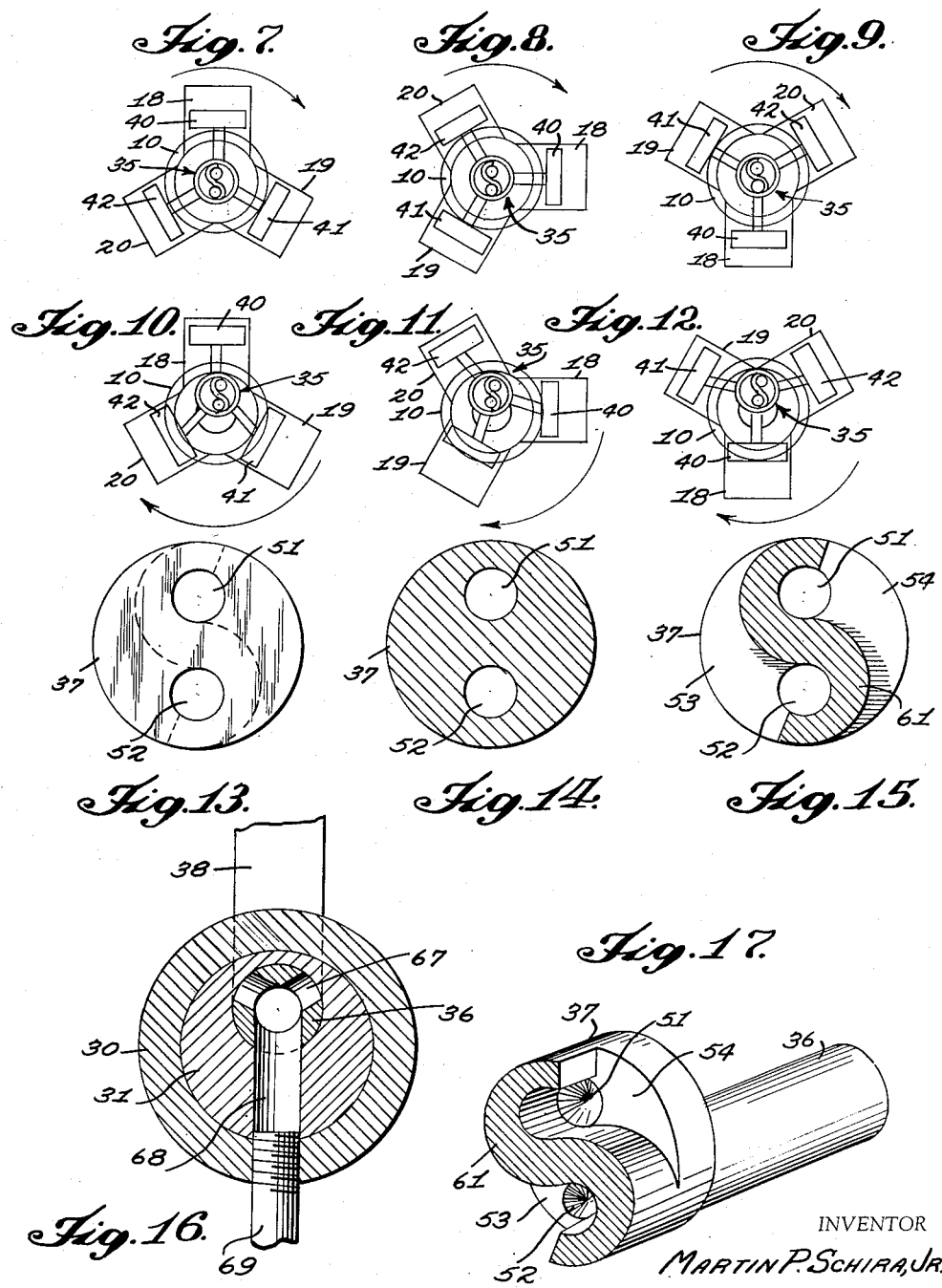

Patented July 6, 1954

2,682,837

UNITED STATES PATENT OFFICE 2,682,837

VARIABLE DISPLACEMENT HYDRAULIC TORQUE CONVERTER

Martin P. Schira, Jr., Spring Lake Heights, N. J.

Application November 16, 1951, Serial No. 256,774

3 Claims. (Cl. 103—161)

This invention relates to hydraulic torque converters and more particularly to a hydraulic torque converter having an adjustably variable displacement or stroke.

It is among the objects of the invention to provide an improved hydraulic torque converter adapted to be driven by a power plant, such as a vehicle engine, and to drive one or more fluid motors for propelling a vehicle or for other purposes; which is adjustably variable from a zero displacement to a maximum displacement which may be greater than the displacement of the associated fluid motor or motors if a speed increasing overdrive is desired; in which the displacement is continuously or smoothly variable rather than in a step by step manner; which is a positive displacement device; and which is simple and durable in construction, economical to manufacture, and positive and efficient in operation.

Other objects and advantages will become apparent from a consideration of the following description and the appended claims in conjunction with the accompanying drawings wherein:

Figure 1 is a side elevational view of a variable displacement torque converter illustrative of the invention;

Figure 2 is a transverse cross sectional view on the line 2—2 of Figure 1;

Figure 3 is a longitudinal cross sectional view on the line 3—3 of Figure 2;

Figure 4 is a side elevational view of an eccentric shaft constituting an operative component of the device;

Figure 5 is a view similar to Figure 4, but looking at the other side of the shaft from that illustrated in Figure 4;

Figure 6 is a transverse cross sectional view on the line 6—6 of Figure 3;

Figures 7, 8 and 9 are diagrammatic views showing different rotational positions of the device when in zero displacement condition;

Figures 10, 11 and 12 are diagrammatic views similar to Figures 7, 8 and 9 showing different rotational positions of the device when in maximum displacement condition;

Figure 13 is an end elevational view of the eccentric shaft illustrated in Figure 4, looking from the line 13—13 in Figure 4;

Figure 14 is a transverse cross sectional view on the line 14—14 of Figure 4;

Figure 15 is a cross sectional view on the line 15—15 of Figure 4;

Figure 16 is a cross sectional view on the line 16—16 of Figure 3;

Figure 17 is a perspective view of a fragmentary portion of the eccentric shaft illustrated in Figures 4 and 5; and Figure 18 is a diagrammatic illustration showing the incorporation of the torque converter in an automotive vehicle.

With continued reference to the drawings, the torque converter comprises a pump including a cylindrical crankcase 10 having outwardly extending annular flanges 11 and 12 disposed one at each end thereof. A cover plate 13 is secured to the flange 12 at one end of the crankcase by suitable means, such as the bolts 14 extending through registering apertures in the flange and the marginal portion of the cover plate and a sealing gasket 15 is disposed between the cover plate and the flange to provide a fluid seal at the corresponding end of the crankcase. A boss 16 projects outwardly from the center of the cover plate 13 and has a recess of noncircular cross sectional shape therein and a drive shaft 17 has on one end a portion of noncircular cross sectional shape received in the boss 16 to drive the torque converter.

Various other means may be provided for connecting a suitable power plant, such as a vehicle engine, to the crankcase of the torque converter to rotate the latter. For example, the bolts 14 could be extended through apertures in a flange or disc member driven by the engine.

Cylinders 18, 19 and 20 project radially from the crankcase 10 at substantially equal angular intervals around the latter and have their longitudinal center lines or axes spaced apart longitudinally of the crankcase, as is particularly illustrated in Figure 1. The cylinders are provided at their outer ends with heads 21, 22 and 23 respectively, closing the outer ends of the cylinders. It will be noted that the crankcase and the cylinders rotate about the axis of the crankcase whenever the torque converter is driven by the associated power plant.

A thickened end wall 24 is secured in the end of the crankcase 10 remote from the end plate 13, by suitable means, such as bolts 25 extending through registering apertures in an annular extension of the end wall 24 and in the flange 11 of the crankcase. The end wall 24 is provided with a bore 26 extending coaxially therethrough and with fluid passages 27 extending from the bore 26 to the inner face of the end wall around a beveled portion 28 of the latter and communicating with the interior of the crankcase 10.

A fixed collar or bearing 30 of cylindrical shape is disposed adjacent the end wall 24 coaxially of the crankcase 10 and a bushing 31 extends through this collar and through the bore 26 in the end wall 24 and is journaled in the end wall.

The bushing 31 is provided with two bores 32 and 33 extending longitudinally thereof and disposed at respectively opposite sides of the longitudinal center line or axis of the bushing. The bore 32 extends from the fluid passage 27 in the end wall 24 to a location intermediate the length of the bearing 30 and a fluid return conduit 34 is threaded at one end into a tapped hole provided in the collar 30 and communicates with the bore 32 at the adjacent end of the latter to return fluid from a fluid motor to the interior of the crankcase 10 which is maintained substantially filled with hydraulic fluid during the operation of the device.

An eccentric shaft, generally indicated at 35, has an elongated shank 36 extending through and journaled in the bore 33 of the bushing and has an elongated, cylindrical bearing portion 37 on one end of the shank and disposed within the crankcase 10. The bearing portion 37 has its longitudinal center line or axis substantially parallel to the longitudinal center line or axis of the shank 36 and spaced laterally from the latter a distance between the longitudinal center line of the bore 33 in the bushing and the longitudinal center line or axis of the bushing, so that the bearing portion 37 can be moved to a condition of coaxiality or concentricity relative to the bushing 31 and can be moved to various degrees of eccentricity relative to the bushing by rotation of the shank 36 of the eccentric shaft. Suitable means, represented by the arm 38, is mounted on the shank 36 at the side of the bearing 30 remote from the end wall 24 for adjustably rotating the eccentric shaft to thereby vary the displacement of the torque converter in a manner presently to be described. The control means may be either manual or automatic, as may be found desirable in particular installations.

Pistons 40, 41 and 42 are reciprocably disposed in the cylinders 18, 19 and 20 respectively, and connecting rods 43, 44 and 45 are pivotally connected each at one end to a corresponding piston and are journalled at their other ends on the bearing portion 37 of the eccentric shaft 35.

In the arrangement illustrated, each connecting rod has on its piston connected end a bearing formation 46 receiving a wrist pin 47 journalled at its ends in the piston skirt and has on its other end a bearing formation 48 surrounding the bearing portion 37 of the eccentric shaft, the bearing portions 48 of the several connecting rods being disposed in side by side relationship on the eccentric bearing portion 37, as indicated at 48, 49 and 50 in Figure 3.

The bearing portion 37 of the eccentric shaft is provided with bores 51 and 52 which extend longitudinally of this bearing portion at respectively opposite sides of the longitudinal center line or axis of the eccentric bearing portion. The bearing portion is cut away at diametrically opposite sides of its bearing surface, as indicated at 53 and 54 in Figures 15 and 17, at spaced apart locations therealong, as indicated at 55, 56 and 57 in Figure 4, and 58, 59 and 60 in Figure 5, the cut away portions constituting circumferentially extending slots arranged in pairs with the two slots of each pair at diametrically opposite sides of the shaft bearing portion and each pair of slots disposed within a corresponding connecting rod bearing. The portion of the eccentric rod bearing portion 37 between the two slots of each pair is reduced to an S, cross sectional shape as indicated at 61 in Figures 15 and 17, so that hydraulic fluid may flow readily to or from the bores 51 and 52 within the cut away or slotted portion of the bearing portion of the eccentric shaft.

Each of the connecting rods 43, 44 and 45 is provided with an axially extending bore, as indicated at 62 for the connecting rod 43 in Figures 2 and 3, and the pistons and wrist pins are provided with openings, as indicated at 63 for the piston 40, and 64 for the associated wrist pin, through which openings the bore in the associated connecting rods communicate with the space within the cylinder between the cylinder head and the adjacent head end of the associated piston.

The bore in each connecting rod communicates with the slots of the corresponding pair of slots in the bearing portion 37 of the eccentric shaft, one slot of the corresponding pair being in communication with the connecting rod bore during one half of the rotation of the crankcase 10 about the eccentric shaft and being in communication with the other slot during the remaining half of each revolution of the crankcase.

The bore 51 opens to the end of the bearing portion 37 remote from the shank 16 and communicates with the interior of the crankcase 10. This bore, together with the bores in the several connecting rods and the openings in the pistons and wrist pins, constitute fluid passages leading from the interior of the crankcase to the spaces within the several cylinders between the cylinder heads and the corresponding pistons.

With this arrangement, as each piston is moving inwardly of its associated cylinder, the bore of its connecting rod will be in communication with the corresponding slot leading from the bore 51 to the bearing surface of the eccentric shaft bearing portion 37, so that hydraulic fluid will be drawn from the interior of the crankcase into the space between the cylinder head and the corresponding piston. As soon as the piston reaches its bottom dead-center position relative to the associated cylinder, communication of the bore of its connecting rod with the slot connected to the bore 51 is interrupted and, as the piston starts to move outwardly relative to its associated cylinder the connecting rod bore comes into communication with the slot leading from the bore 52 which, together with the connecting rod bores and the openings in the pistons and wrist pins, constitute fluid outlet passages for the pump.

The bore 52 is blocked at the end of the bearing portion 37 remote from the shank, as indicated at 65 in Figure 3, but the shank 36 is provided with a coaxial bore 66 which extends the bore 52 longitudinally of the shank 36 to a location within the fixed bearing 30. Near the end of the bore 66 within the fixed bearing the shank 36 is provided with angularly spaced apart ports 67 and the bearing is provided with a fluid passage 68 which communicates with the bore 66 through these ports 67. A fluid pressure or outlet conduit 69 is connected at one end with the bearing 30 in communication with the fluid passage 68, so that hydraulic fluid forced out of the cylinders as the pistons move outwardly in the cylinders and led through the outlet passages provided by the bores in the connecting rods, the bores 52 and 66 in the eccentric shaft and the corresponding slots in the eccentric shaft, passes through the fluid passage 68 in the bearing into the outlet conduit 69 which conducts it to the vehicle impelling fluid motor or motors. After the fluid under pressure passes through the hydraulic motor or motors, it is returned to the interior of the crankcase 10 through the return conduit 34, the bore 32 in the bushing 31 and the fluid passage 27 in the end wall 24.

In the installation drawing shown in Figure 18, the torque converter, generally indicated at 70, is shown mounted on the rear end of a vehicle engine 71 mounted on a vehicle frame 72. The bearing 30 is mounted on the frame by a cross member 73 and the conduits 69 and 34 conduct the hydraulic fluid to and from vehicle propelling fluid motors 74 and 75 mounted one on each of the rear driving wheels of the vehicle. A manually operated reversing valve 76 is connected into the conduits 69 and 34, so that the direction of rotation of the fluid motors can be reversed, when desired, and suitable means, not illustrated, is connected to the lever 38 for regulating the displacement of the variable displacement torque converter.

With this arrangement, the vehicle can be driven at any desired speed ratio between the engine and the rear wheels in either a forward or reverse direction, and the drive can be placed in neutral with the engine operating by adjusting the torque converter to its zero displacement condition, as described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A variable displacement hydraulic torque converter comprising a crankcase adapted to be connected at one end to a rotatable driving element and having at its other end an end wall provided with a bearing aperture disposed substantially coaxially of the axis of rotation of said crankcase, cylinders projecting radially from said crankcase at substantially equal angular intervals therearound, a fixed bearing disposed adjacent said end wall substantially coaxial of the axis of rotation of said crankcase, a cylindrical bushing journalled in said end wall and extending through said bearing and having bores extending longitudinally thereof and disposed at respectively opposite sides of the longitudinal center line of said bushing, said bearing having a fluid passage therein communicating with one of the bores in said bushing and said end wall having a fluid passage therein communicating with said one bore and with the interior of said crankcase, a fluid return conduit connected to said bearing and communicating with the fluid passage therein, an eccentric shaft including a shank portion journalled in and extending through the other bore in said bushing and a bearing portion on one end of said shank portion and disposed within said crankcase, the axis of said bearing portion being substantially parallel to the axis of said shank and displaced laterally from the latter a distance substantially equal to the distance between the axis of said shank and the axis of said bushing so that said bearing portion can be moved into and out of concentricity with said crankcase by rotational movement of said eccentric shaft, means on said eccentric shaft for imparting rotational movements of adjustment thereto, pistons reciprocable one in each of said cylinders, connecting rods pivotally connected one to each piston each at one end thereof and journalled at their other ends on the bearing portion of said eccentric shaft, each of said connecting rods having a bore extending therethrough and each of said pistons having an opening therein connecting the bore in the associated connecting rod with the space in the corresponding cylinder between the piston and the outer end of the cylinder, the bearing portion of said eccentric shaft having bores extending longitudinally thereof and at respectively opposite sides of the axis and opening to the bearing surface thereof at substantially diametrically opposite sides of said bearing surface, the last mentioned bores communicating sequentially with the bores in said connecting rods at different rotational positions of said eccentric shaft and one of said last mentioned bores being in communication with the interior of said crankcase to provide with the bores in said connecting rods and the openings in said pistons, fluid inlet passages for said cylinders and the other of said last mentioned bores being out of communication with the interior of said crankcase and constituting a fluid outlet passage from said connecting rods through said bearing portion, said shank having a bore therein communicating with said other bore in the bearing portion of the eccentric shaft and said bearing having a second fluid passage therein communicating with the bore in said shank, and a fluid outlet conduit connected to said bearing in communication with said second fluid passage in the latter.

2. A variable displacement pump comprising a rotatable crankcase adapted to be connected at one end to a rotatable driving element, an end wall closing the other end of said crankcase and having a bore therethrough coaxial with the axis of rotation of said crankcase and a fluid passage extending from said bore intermediate the length of the latter to the inner surface of said end wall, a fixed collar disposed adjacent said end wall, a bushing extending through said collar and journalled in the bore in said end wall, said collar having a first fluid passage therein and said bushing having a first bore therein connecting the fluid passage in said collar to the fluid passage in said end wall, a fluid return conduit connected at one end to said collar in communication with said first fluid passage for returning used hydraulic fluid to the interior of said crankcase, said bushing having a second bore extending longitudinally therethrough with its longitudinal center line substantially parallel to and displaced a predetermined distance from the longitudinal center line of said bushing, an eccentric shaft including a shank extending through and journalled in said second bore in said bushing and a bearing portion on one end of said shank and disposed within said crankcase, said bearing portion having its longitudinal center line substantially parallel to the longitudinal center line of said shank and spaced therefrom substantially the same distance as that between the longitudinal center line of said second bore in said bushing and the longitudinal center line of the bushing, at least one cylinder projecting radially from said crankcase and having a closed outer end, a piston reciprocable in said cylinder, a tubular connecting rod connecting said piston to the bearing portion of said eccentric shaft, said piston having an opening therein placing the bore of said tubular connecting rod in communication with the space within said cylinder between the outer end of the cylinder and the adjacent end of said piston, said bearing portion having a fluid passage therein placing the bore of said connecting rod in communication with the interior of said crankcase during a portion of each rotation of said crankcase in which said piston is moving inwardly of said cylinder, said collar having a second fluid passage therein, a fluid outlet conduit connected at one end to said collar in communication with said second fluid passage, said eccentric shaft having a fluid passage therein placing the bore of said connecting rod in communication with said fluid outlet conduit during a portion of each rotation of said crankcase in which said piston is moving outwardly of said cylinder, and means connected to the shank of said eccentric shaft for imparting rotational movements to the latter to vary the eccentricity of the bearing portion of said eccentric shaft relative to the rotational axis of said crankcase.

3. A variable displacement pump comprising a rotatable crankcase adapted to be connected at one end to a rotatable driving element, at least one cylinder carried by said crankcase and disposed radially thereof and having a closed outer end, an element fixed relative to said crankcase supporting the other end of the latter, an eccentric shaft extending through said fixed element and having an offset portion disposed within said crankcase and eccentrically of the rotational axis of the latter, a piston reciprocable in said cylinder, a tubular connecting rod connecting said piston to the offset portion of said eccentric shaft to move said piston inwardly and outwardly of said cylinder during each rotation of said crankcase and having its bore in communication with the space within said cylinder between the closed outer end of the latter and said piston, said fixed element having a fluid return passage extending therethrough to the interior of said crankcase and having a fluid outlet passage therein, the offset portion of said eccentric shaft having a fluid inlet passage therein placing the bore of said connecting rod in communication with the interior of said crank shaft during a portion of each rotation of said crankcase in which said piston is moving inwardly of said cylinder and said eccentric shaft having a fluid passage therein placing the bore of said connecting rod in communication with the fluid outlet passage in said fixed element during a portion of each rotation of said crankcase in which said piston is moving outwardly of said cylinder, and means connected to said eccentric shaft for imparting rotational movements to the latter and bearing the displacement of the pump by changing the eccentricity of the offset portion of said eccentric shaft relative to the rotational axis of said crankcase.

References Cited in the file of this patent

UNITED STATES PATENTS

| Number | Name | Date |
| --- | --- | --- |
| 1,843,338 | Replogle | Feb. 2, 1932 |
| 2,336,996 | McDonough | Dec. 14, 1943 |